// United States Patent [15] 3,651,334
Thompson et al. [45] Mar. 21, 1972

[54] TWO-PHASE RATIOLESS LOGIC CIRCUIT WITH DELAYLESS OUTPUT

[72] Inventors: Andrew V. Thompson; Richard F. Herlein, both of Sunnyvale, Calif.

[73] Assignee: American Micro-Systems, Inc., Santa Clara, Calif.

[22] Filed: Dec. 8, 1969

[21] Appl. No.: 883,066

[52] U.S. Cl. ..............................307/208, 307/205, 307/215, 307/251, 307/279, 340/173
[51] Int. Cl. ....................................................H03k 17/60
[58] Field of Search ..............307/205, 215, 246, 208, 221 C, 307/251, 279, 304; 340/173

[56] References Cited

UNITED STATES PATENTS

| | | | |
|---|---|---|---|
| 3,502,908 | 3/1970 | Christensen | 307/205 X |
| 3,506,851 | 4/1970 | Polkinghorn et al. | 307/304 |
| 3,521,081 | 7/1970 | Vasseur et al. | 307/251 X |
| 3,524,077 | 8/1970 | Kaufman | 307/205 X |

OTHER PUBLICATIONS

Boysel et al.; Multiphase Clocking Achieves 100–N sec. MOS Memory, Electronic Design News, June 10, 1968, pp. 50– 52, 54, & 55

*Primary Examiner*—Stanley T. Krawczewicz
*Attorney*—Owen, Wickersham & Erickson

[57] ABSTRACT

A logic circuit providing a delayless inversion of a data input signal which employs one clock phase for simultaneously precharging the output node and discharging a storage node that is the gate of a logic transistor and is connected to the data input through a gating transistor. A second clock phase causes the gating transistor to conduct and, depending on the data input signal, the input node either remains discharged or is charged negative, thereby causing the output node to either remain negative or to be discharged through the logic transistor.

5 Claims, 4 Drawing Figures

INVENTORS
ANDREW V. THOMPSON
RICHARD F. HERLEIN
BY
Owen, Wickersham & Erickson
ATTORNEYS INVENTORS
ANDREW V. THOMPSON
RICHARD F. HERLEIN
BY
Owen, Wickersham & Erickson
ATTORNEYS

TWO-PHASE RATIOLESS LOGIC CIRCUIT WITH DELAYLESS OUTPUT

This invention relates to a ratioless logic circuit which can be embodied in digital computer and data handling systems.

Ratioless logic circuits may be defined as those which employ a conditional discharge of an unconditional precharge to represent the two possible logic states, whereas ratio type logic circuitry employs the voltage divider principle to represent the two possible logic states. A general object of the present invention is to provide an improved ratioless logic circuit. For certain logic networks used in digital computing apparatus, such as decoders, sample and hold flip-flops and digital comparators, it is essential to provide a variable signal and its complement at logically the same time. Another object of the present invention is to provide a logic circuit that will fulfill this requirement.

Another object of the present invention is to provide a logic circuit that achieves a logical delayless inversion of a data input signal by utilizing only two clock phases or time spaced synchronizing signals.

Yet another object is to provide a logic circuit that accomplishes the aforesaid objectives and uses relatively less chip space when embodied in an integrated circuit device that previously developed logic circuits.

Another object of the present invention is to provide a two phase logic circuit for producing a logically delayless output which is the logical nand function of the inputs.

Still another object is to provide a logic circuit that is particularly adaptable for embodiment in insulated gate field effect transistor devices.

Broadly, the invention comprises a two-phase ratioless logic circuit for producing a logically delayless inverted output. An output node located at an interconnection between a precharge transistor and a logic transistor is first precharged on one clock phase. This same clock phase is also applied to the gate electrode of a disabling transistor which discharges a node between a gating transistor and the gate electrode of the logic transistor. A second clock phase turns on the gating transistor to conduct an incoming data signal which will either cause the logic transistor to conduct and the output node to discharge to a positive level or will cause the input node to stay at its discharged level, thereby preventing the logic transistor from conducting and causing the precharged output node to remain at its precharged level.

Other objects, advantages and features will become apparent from the following detailed description taken in conjunction with the accompanying drawing, in which.

Figure 1:
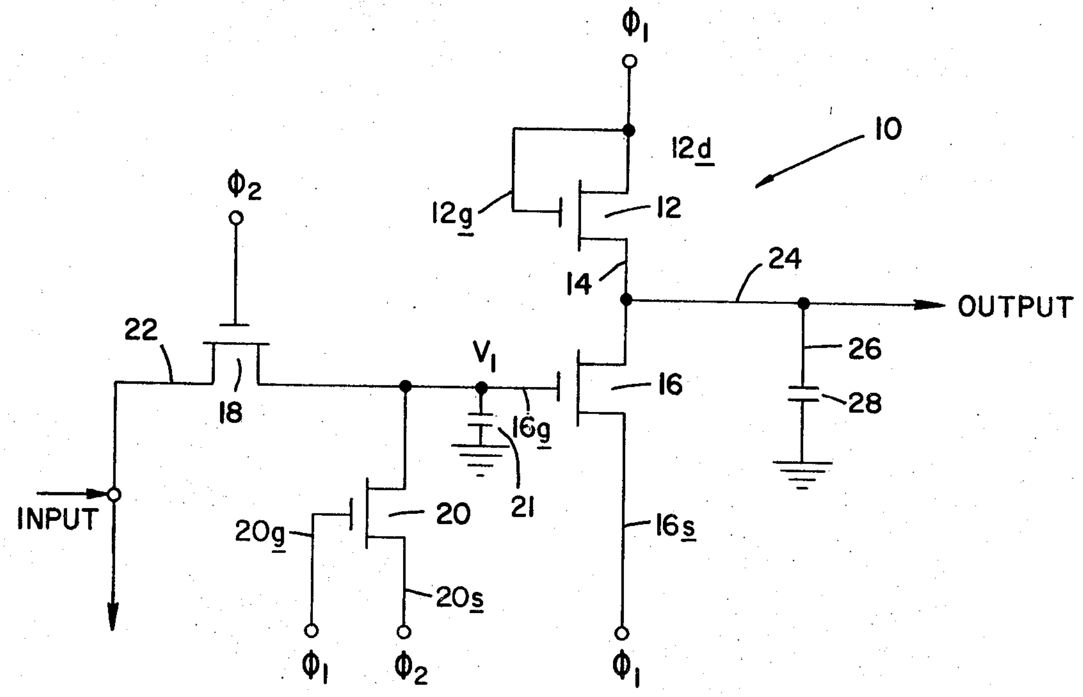
FIG. 1 is a diagrammatic illustration of a logic circuit embodying the principles of the present invention.

With reference to the drawing, FIG. 1 illustrates diagrammatically a logic circuit 10 embodying the principles of the present invention which will provide a logically delayless inverted output when used in a digital clocked dynamic logic system.

The circuit may be embodied in an integrated semiconductor body such as a P-type silicon monocrystalline substrate or wafer, utilizing insulated gate field effect transistors or IGFET's.

Figure 2:
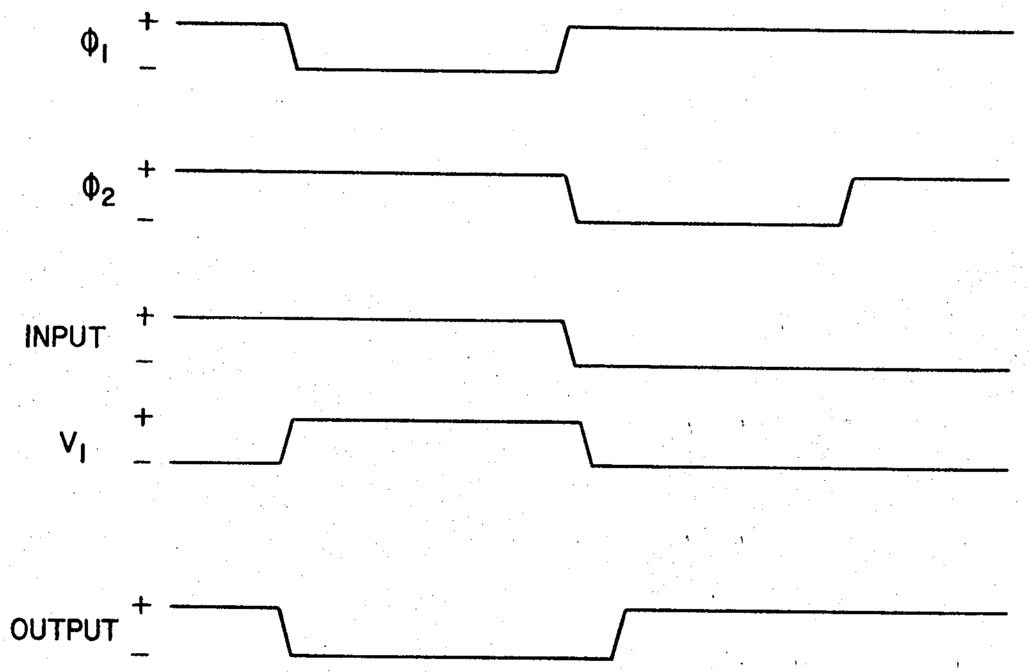
FIG. 2 is a graphic representation of the clock pulse synchronizing signals and data input signal supplied to the circuit of FIG. 1.

The logic cell 10 of FIG. 1 comprises a precharging transistor 12 having a gate electrode 12*g* and a drain electrode 12*d* both connected to a synchronized phase one clock pulse input 01. This transistor's source is connected by a lead 14 to a logic or driving transistor 16 whose source electrode 16*s* is also connected to another clock phase one terminal. The gate electrode 16*g* of the logic transistor 16 is connected both to the source electrode of a gating transistor 18 and to the drain electrode of a disabling transistor 20. The interconnection between the source electrode of the gating transistor 18, the drain electrode of the diabling transistor 20 and the gate electrode of the logic transistor 16 produces a parasitic capacitance represented by the capacitor 21 connected to a ground terminal. The gate electrode 20*g* of the driving transistor 20 is also connected to a phase one clock terminal. The source electrode 20*s* of the disabling transistor 20 and the gate electrode of the gating transistor are both connected to a phase two clock voltage source 02 which, as shown in FIG. 2 is timed to provide clocking pulse inputs at alternatively timed intervals relative to the 01 clock inputs, 01. The source electrode 20*s* may be connected to ground instead of the phase two clock voltage source or to any signal which is positive when the clock phase one is negative. A data input lead 22 is connected to the drain input electrode of the gating transistor 18. An output lead 24 is connected to and extends from the interconnecting lead 14, and branching from this output lead is a lead 26 connected to one terminal of a capacitance 28 whose other terminal is grounded. The capacitance 28 may be a combination of parasitic and designed-in capacity.

The operation of the logic cell 10 may be more easily understood by referring to the timing diagrams of FIG. 2 as the cell circuit is analyzed. When a voltage pulse is supplied at the various phase one clock inputs 01, the precharging transistor 12 is turned on and precharges the output node, including the lead 24, to a negative level (assuming that negative clock or timing voltages are used). This same phase one clock pulse, when applied to the gate electrode of the disabling transistor 20, turns this transistor on and discharges, that is, drives positively the node $V_1$ between the gating transistor 18 and logic transistor 16. The final positive voltage of this latter node will be the final positive voltage of a phase two clock 02 which, at this moment, is at or near ground potential. Now, when the phase one clock returns to the positive level nothing occurs until the phase two clock goes negative. When this occurs, the gating transistor 18 is turned on so that it will conduct any incoming data signal on the input lead 22. The node $V_1$ between the transistors 16 and 18 will either be charged negatively or left at its positive state by whatever signal source is connected to the input node. If the input node is negative, the node, $V_1$, between the transistors 16 and 18 will be charged negative by the gating transistor 18. Since the node $V_1$, between transistors 16 and 18 is negative, the output node in the output lead 24 will be driven positive because the transistor 16 will conduct and the charge stored on the output node will be discharged to the ground level provided by clock input to the transistor 16. If the input signal in lead 22 was positive when the phase two clock is on or negative, then the input node between the transistor 16 and 18 would remain at its positive state, the transistor 16 would not conduct, and the output precharge on the node including lead 24 would remain negative. Thus, the two input conditions just described provide either a logical zero or a logical one on the output lead 24, the essential feature being that during the phase two clock pulse, the input signal on the input node or lead 22 is logically inverted and propagated to the output node or lead 24 without waiting for additional clock time and this logical inversion is accomplished with only the two clock phases 01 and 02.

Figure 3:
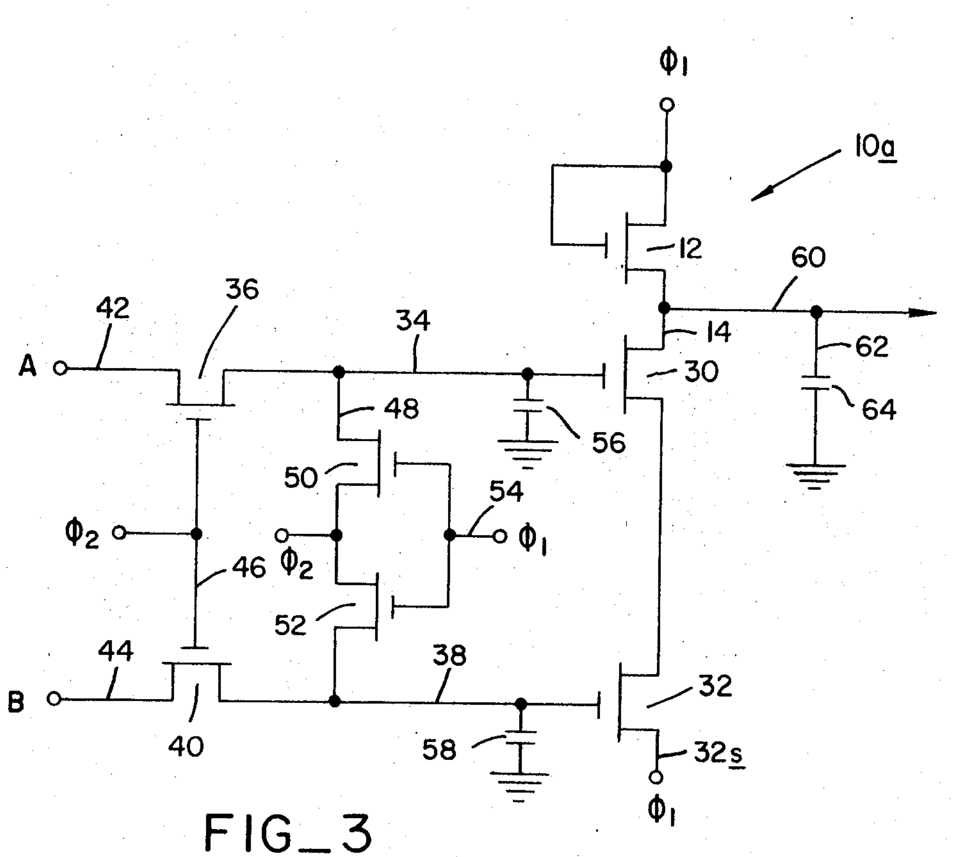
FIG. 3 is a diagrammatic illustration of a logic circuit according to the present invention utilizing nand gate implementation.

While the logic cell 10 in the circuit of FIG. 1 utilizes a single logic transistor 16 that performs an inversion function, the implementation of nand or nor gate functions may also be accomplished within the scope of the invention. In FIG. 3 a logic cell 10*a* is shown which utilizes a nand gate connected to two data input sources A and B. Here, the precharging transistor 12 is connected by a lead 14 to a logic section of the cell 10*a* comprised of a pair of logic transistors 30 and 32 which are source-drain connected in series. The drain of one of these logic transistors 30 is connected to the source electrode of the precharging transistor 12 and the source electrode 32*s* of the other logic transistor 32 is connected to the phase one clock 01. The gate electrode of the transistor 30 is connected by a lead 34 to source electrode of a first gating transistor 36, and the gate electrode of the other logic transistor 32 is connected by a lead 38 to the source electrode of another gating transistor 40. A pair of data input leads 42 and 44 are each connected from the data input terminals A and B to the drain electrodes of the gating transistors 36 and 40 respectively. The gate electrodes of these gating transistors are connected by a lead 46 to a phase two clock input 02, which is also connected to the source leads of transistors 50 and 52. The drain lead of transistor 50 is connected to the lead 34 and the drain lead of transistor 52 is connected to the lead 38. An interconnecting lead 53 between the source electrodes of transistors 50 and 52 is connected to the phase two clock input or to any signal source that is positive when the phase one clock is negative. The gate electrodes of the transistors 50 and 52 are also connected by a lead 54 to the phase one clock. Connected to each of the leads 34 and 38 is a parasitic capacitance which is shown typically by capacitors 56 and 58 respectively, each of which is connected to a ground terminal. The output of this cell **12*b* is provided through a lead 60 extending from the interconnecting lead 14 between the transistors 12 and 30. Extending from this output lead is a branching lead 62 connected to one terminal of a load capacitor 64 whose other terminal is grounded. This capacitor (64**) may be either parasitic or it may be designed in.

The circuit **10*a* functions essentially the same as the circuit 10 with respect to precharging the output and disabling the logic transistors. In this circuit, however, the output will remain at the negative precharge level unless both the inputs A and B are held at a negative level by the signal sources. If and only if both inputs are negative during the clock phase two, the logic transistors will discharge the negative precharge level stored on the capacitor 64. Thus the circuit 10*a*** implements the logical nand function in a logically delayless fashion.

Figure 4:
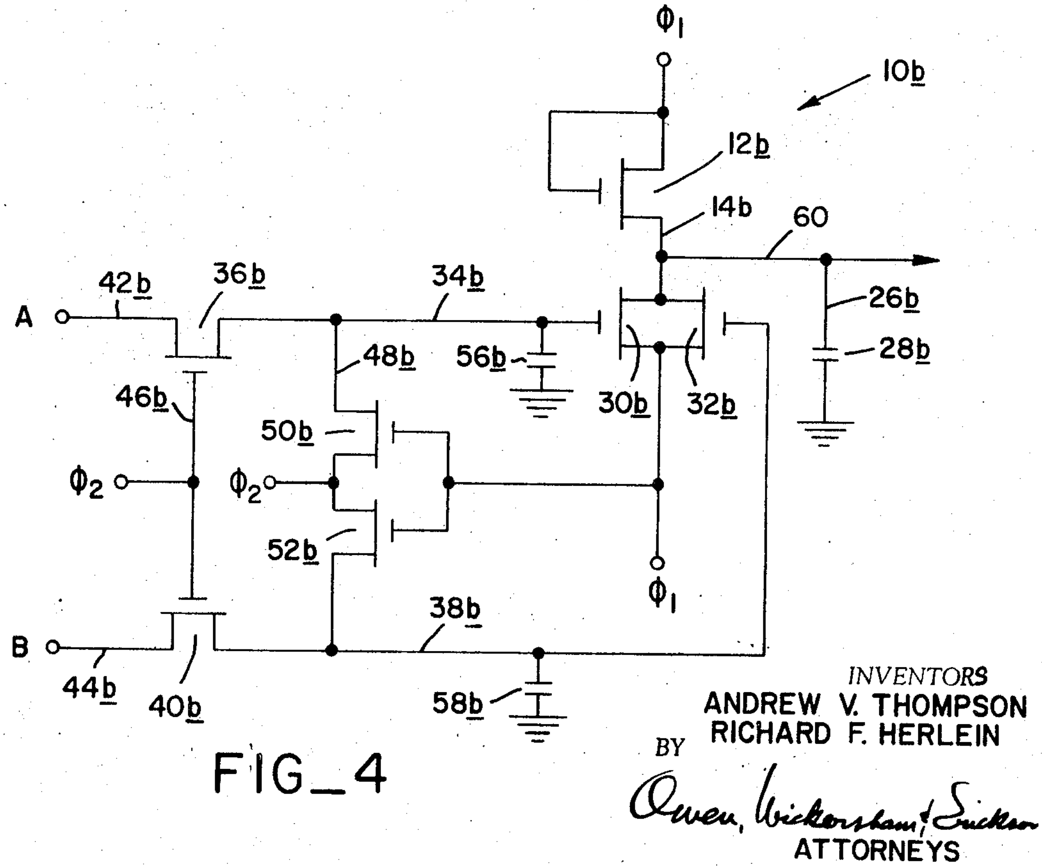
FIG. 4 is a diagrammatic illustration of our logic circuit utilizing nor gate implementation.

The nor gate cell **10*b* shown in FIG. 4 is another embodiment of the present invention which is similar to the previous embodiments with respect to the precharging and enabling functions that provide delayless inversion of data single inputs to the terminals A and B. Here, the logic section of the cell is comprised of a pair of logic transistors 30*b* and 32*b* which are both source-drain connected in parallel on one side to the precharging transistor 12*b* through an interconnecting lead 14*b*. On the other side these logic transistors are connected to a phase one clock input 01. As with the cell 10*a*, a pair of gating transistors 36*b* and 40*b* are provided which are each source-drain connected from data input terminals A and B through leads 42*b* and 44*b* respectively to the gate electrodes of the logic transistors 30*b*, 32*b*. Again, the gate electrodes of the gating transistors 36*b* and 40*b* are connected by a common lead 46*b* which is also connected to a phase two clock input, 02. The source leads of transistors 50*b* and 52*b* are connected to the phase two clock input or to any signal source that is positive when the phase one clock is negative. The gate electrodes of the latter transistors are connected to a phase one clock input, 01. Here the A and B inputs to the parallel connected logic transistors 30*b* and 32*b* provide a "nor" logic function by enabling both when they simultaneously receive inputs to their gate electrodes. As with the circuit 10*a*, a pair of capacitance elements 56*b* and 58*b* are shown connected on one side to ground and on the other sides to each of the leads 34*b* and 38*b*. The circuit 10*b* functions essentially the same as the circuits 10 and 10*a* with respect to precharging the output and disabling the logic transistors. In this circuit, however, the output will not remain at the negative precharge level (i.e., will be discharged to the positive clock level of 01) if either of the inputs A or B is held to a negative level by the signal sources. If and only if both inputs are positive during the clock phase two, the output will remain at the negative precharge level. Thus the circuit 10*b*** implements the logical nor function in a logically delayless fashion.

To those skilled in the art to which this invention relates, many changes in construction and widely differing embodiments and applications of the invention will suggest themselves without departing from the spirit and scope of the invention. For example, composite circuits combining either nand or nor functions as well as inversion functions may be devised within the scope of the invention. The disclosures and the description herein are purely illustrative and are not intended to be in any sense limiting.

We claim:

1. A ratioless logic circuit for producing a logically delayless output comprising:

an input node, a storage node and an output node;

a precharging transistor connected to said output node;

means for impressing a first synchronizing signal on said precharging transistor for controlling the conduction thereof and for precharging said output node;

logic transistor means connected to said precharging transistor at said output node and also to said means for impressing a first synchronizing signal;

a gating transistor connected for controlling the passage of input data signals to said logic transistor, said gating transistor being connected to said logic transistor such that input data signals passing through said gating transistor will cause said logic transistor to be either in a conducting or nonconducting state;

means for impressing a second synchronizing signal source on said gating transistor such that said input data pulses are passed therethrough when said second synchronizing signal is present; said first and second synchronizing signals being 180° out of phase;

and disabling transistor means connected to said and logic transistors and to said first synchronizing signal such that input data signal are shunted to ground when said first synchronizing signal is present.

2. The logic circuit as described in claim 1 wherein said logic transistor means is a single insulated gate field effect semiconductor device.

3. The logic circuit as described in claim 1, wherein said logic transistor means comprises a pair of insulated gate field effect transistors source-drain connected in series to form a logical nand network in said input node.

4. The logic circuit as described in claim 1 wherein said logic transistor means comprises a pair of insulated gate field effect transistors source-drain connected in parallel to form a logical nor network in said input node.

5. A ratioless logic circuit comprising:

a precharging insulated gate field effect transistor having source, drain and gate electrodes;

means for impressing a first synchronizing signal on the gate and drain electrodes of said first transistor;

a logic insulated gate field effect transistor (IGFET) having a drain electrode connected through an output node to the source electrode of said precharging transistor, a source electrode connected to said first synchronizing signal and a gate electrode;

a gating IGFET having a source electrode connected to a data input source, a gate electrode, and a drain electrode connected through a storage node to said gate electrode of said logic transistor;

means for impressing a second synchronizing signal, time spaced from said first synchronizing signal, on the gate electrode of said gating transistor;

and a disabling IGFET for discharging said storage node having a drain electrode connected to the gate of said second transistor, a gate electrode connected to said means for impressing said first synchronizing signal and a source electrode connected to said means for impressing said second synchronizing signal or to ground.

* * * * *

UNITED STATES PATENT OFFICE

CERTIFICATE OF CORRECTION

Patent No. 3,651,334 Dated March 21st, 1972

Inventor(s) ANDREW V. THOMPSON and RICHARD F. HERLEIN

It is certified that error appears in the above-identified patent and that said Letters Patent are hereby corrected as shown below:

Column 4, line 32, insert --gating-- after "said".

Signed and sealed this 8th day of May 1973.

(SEAL)
Attest:

EDWARD M.FLETCHER,JR.
Attesting Officer

ROBERT GOTTSCHALK
Commissioner of Patents